July 27, 1965
A. WILLIAMS
3,196,518
LATHE CUTTER BITS
Filed April 23, 1963
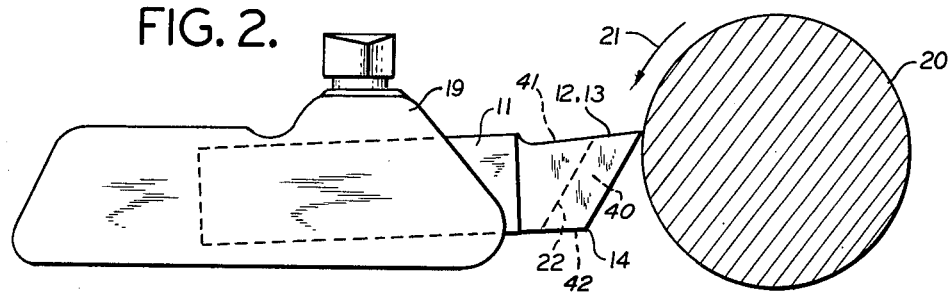
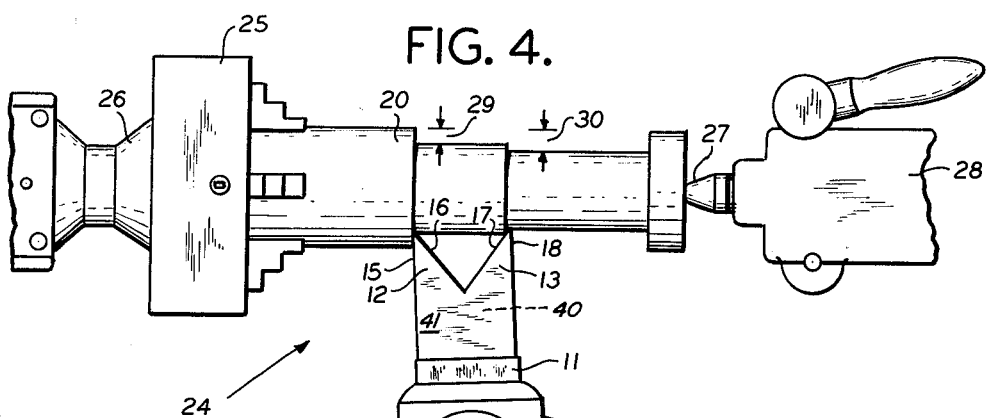
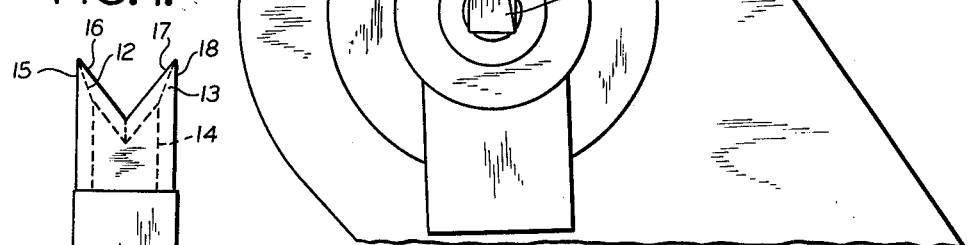
INVENTOR
ALVIN WILLIAMS
BY
Burgess, Dinklage & Sprung
ATTORNEYS.

3,196,518
LATHE CUTTER BITS
Alvin Williams, 223 W. 135th St., New York 30, N.Y.
Filed Apr. 23, 1963, Ser. No. 275,098
2 Claims. (Cl. 29—95)

This invention relates to lathe cutter bits and more particularly to a new and useful lathe cutter bit which can perform a plurality of cutting operations simultaneously and/or a plurality of different types of cutting operations without changing the cutter bit.

Heretofore, each lathe cutter bit was designed to perform a single cutting operation. For example, after rough turning, the rough turning cutter bit has to be removed from the tool holder and a finishing cutter bit substituted in the tool holder for finish turning. The foregoing procedure is time consuming and in each instance involves inefficient readjustments in the work setup. In addition, the mere fact that each cutter bit can perform only one cutting operation at a time is time consuming because of the number of passes that are required to make a cut of any substantial depth.

It is, therefore, an object of this invention to provide a cutter bit which can perform more than one cutting operation.

Another object of the invention is to provide a cutter bit which can perform more than one cutting operation simultaneously.

A still further object of the invention is to provide a cutter bit which can perform eight or more different types of cutting operations without removal of the cutter bit from the tool holder.

In the preferred embodiment of the invention, the cutter bit comprises a shank with two cutting tips extending from one end. Each cutting tip has a cutting edge on both its inside and outside face. In a cutting operation, the cutter bit can be so positioned that the outside cutting edge on the leading cutting tip is set for a certain depth while the inside cutting edge on the trailing cutting tip is set for a greater depth. Thus, two simultaneous cutting operations can be performed with one pass of the cutter bit. It is obvious that in a cutter bit having different types of cutting edges the use of the cutting edges singularly or in pairs will produce eight or more different types of cutting operations without changing the cutter bit.

Other objects and a fuller understanding of the invention may be had by referring to the following description and claims, taken in conjunction with the accompanying drawings in which:

FIG. 1 is a top plan view of the invention;

FIG. 2 is a right side elevation of the invention in a tool holder and against a work piece;

FIG. 3 is a front elevation of the invention; and

FIG. 4 is a top plan view of the invention in a tool holder on a lathe and against a work piece.

With reference to the drawings, FIGS. 1 to 3 illustrate the geometry of the cutter bit according to the invention and show a cutter bit 10 comprising a shank portion 11 and a cutter portion 40 extending therefrom, said cutter portion 40 being substantially in the form of a frustrum of a pyramidal section having M-shaped base sections which correspond to the top and bottom surfaces 41 and 42 respectively of said cutter 40. The cutter portion 40 is disposed so that the prongs, or tips of the M-shaped top surface face outwardly with respect to the shank 11, said tips acting as cutting tips 12 and 13. The cutting tips 12 and 13 have adjacent cutting edges 15 and 16, and 17 and 18 respectively, which are defined by the boundary edges of the top surface 41, with the cutting tip 12 being formed by the intersection of the cutting edges 15 and 16, and the cutting tip 13 being formed by the intersection of the cutting edges 17 and 18.

By reason of its frustro-pyramidal geometry, wherein the top and bottom surfaces 41 and 42 of the cutter 40 are geometrically similar, with the top surface 41 being larger in dimensions, the lateral sides associated with each of the cutting edges 15, 16, 17 and 18 are inclined inwardly toward the bottom surface 42, and thus provide clearance for said cutting edges 15, 16, 17, and 18, and the cutting tips 12 and 13 as well. Each cutting edge 15, 16, 17, and 18 can be formed to perform a different cutting operation. For example, cutting edge 15 can be formed for rough turning and cutting edge 17 for finish turning. It is obvious that many different combinations of cutting edges can be used for cutting edges 15, 16, 17, and 18 to be used singularly or simultaneously in pairs.

In FIG. 2, the cutter bit 11 of FIG. 1 is assembled in a tool holder 19 with its cutters 12 and 13 against a work piece 20. Work piece 20 rotates in the direction of arrow 21. Dotted line 22 depicts the divide between cutter 12 and 13 and FIG. 2 vividly illustrates the taper depicted by dotted line 14 in FIG. 1.

In FIG. 3, the cutters 12 and 13 of FIG. 1 are shown head-on. Both the divide depicted by dotted line 22 in FIG. 2 and the taper depicted by dotted line 14 in FIG. 1 are clearly illustrated. Also illustrated are the cutting edges 15 and 16, and 17 and 18 of cutters 12 and 13 respectively.

In operation, FIG. 4 shows the cutter bit 11 in a tool holder 19 on a tool post 23 on a lathe 24. Work piece 20 is connected between the chuck 25 on headstock spindle 26 and the center 27 of tailstock 28. As shown, cutting edge 15 on cutter 12 is cutting work piece 20 to a depth 29 while cutting edge 17 on cutter 13 is cutting work piece 20 to a greater depth 30. Cutting edge 15 could be rough turning while cutting edge 17 is finish turning, or innumerable other combinations of machining operations could be performed depending on the forms of cutting edges 15, 16, 17, and 18. It is also obvious that by changing the angle of tool holder 19 in a horizontal plane either cutting edge 15 or 17 could be used to cut singularly. By reversing the direction of track of tool holder 19, cutting edges 16 and 18 can be brought into play.

Thus, a unique invention has been provided to obviate the wasteful and time consuming changing of cutter bits ofttimes necessary even when only a slightly different cutting edge is required. The present invention not only provides a multiplicity of cutting edges on one cutter bit, but also provides a means for performing two different cutting operations with one pass of the tool holder to perform two different cutting operations or to increase the depth of cut in a single cutting operation. The term "cutter bit," as used herein and in the claims, is intended to designate a single lathe tool with a plurality of cutting tips extending from a common shank, each cutting tip having a cutting edge on both its inside and outside face, each edge being ground for the particular kind of metal being machined and for accomplishing various classes of work, i.e. turning (rough and finish), threading, grinding, facing, boring, etc. The cutter bit, in accordance with the invention is adapted for being mounted in the commercially available individual lathe tool holders.

Illustrative of the cutter bit tools intended, in accordance with the invention, is a cutter bit, provided with extending from a common shaft, a cutting tip having at least one edge for taking heavy roughing cuts to reduce the diameter of a steel shaft to a predetermined size, as well as with a cutter having an edge for taking finishing cuts. The edge for roughing, i.e. rough turning, does not produce a very smooth finish, while the finish turning edge produces a very smooth finish, both edges being part of the one tool. In one illustrative embodiment the cutting edge for rough turning is straight and the point is only slightly rounded, having a very small radius (approximately 1/64 inch) at the point, while the finish turning edge is very much the same shape as the rough turning edge, but the point is more rounded (approximately 1/32 inch to 1/16 inch radius).

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention.

What is claimed is:

1. A cutter bit for a lathe comprising a shank portion and a cutter portion extending therefrom, said cutter portion being substantially a frustrum of a pyramidal section having an M-shaped base, with said cutter portion having geometrically similar M-shaped top and bottom surfaces which are outwardly disposed with respect to the shank portion, said top surface being the larger in dimensions and having a plurality of cutting edges defined by its boundary edges, and a pair of outwardly disposed cutting tips defined by the intersections of said boundary edges, with the lateral sides of said frustro-pyramidal cutter portion being inclined inwardly toward the bottom surface to provide clearance for said cutting edges and tips.

2. The cutter bit of claim 1 wherein one of the cutting tips and its corresponding lateral edge in the frustro-pyramidal cutter portion is slightly rounded to have a radius within the range of approximately one-sixty-fourth to one-sixteenth of an inch.

References Cited by the Examiner

UNITED STATES PATENTS

| | | | |
|---|---|---|---|
| 66,641 | 7/67 | Shackleton | 29—96 |
| 87,198 | 2/69 | Pierce | 29—95 |
| 490,638 | 1/93 | Clough | 29—95 |
| 1,318,830 | 10/19 | Bartlett | 29—96 |
| 1,327,410 | 1/20 | Simeone | 29—97 |
| 2,382,106 | 8/45 | Schoeppner | 29—96 X |
| 2,688,791 | 9/54 | Luers | 29—95 |
| 2,900,704 | 8/59 | Sweet | 29—96 |
| 2,932,083 | 4/60 | De Nicolo | 29—95 X |
| 3,079,670 | 3/63 | Price | 29—95 |

FOREIGN PATENTS 672,039  5/52  Great Britain.

WILLIAM W. DYER, Jr., *Primary Examiner.*